US008862056B2

(12) United States Patent
Saito et al.

(10) Patent No.: US 8,862,056 B2
(45) Date of Patent: Oct. 14, 2014

(54) WIRELESS COMMUNICATION DEVICE, WIRELESS COMMUNICATION METHOD, PROGRAM, AND WIRELESS COMMUNICATION SYSTEM

(75) Inventors: Erika Saito, Tokyo (JP); Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 13/401,166

(22) Filed: Feb. 21, 2012

(65) Prior Publication Data

US 2012/0244902 A1    Sep. 27, 2012

(30) Foreign Application Priority Data

Mar. 23, 2011   (JP) .................................. 2011-064109

(51) Int. Cl.
*H04B 7/00* (2006.01)
*H04W 84/20* (2009.01)
*H04W 8/00* (2009.01)

(52) U.S. Cl.
CPC .............. *H04W 84/20* (2013.01); *H04W 8/005* (2013.01)
USPC ........................... 455/41.2; 455/518; 455/519

(58) Field of Classification Search
CPC ...... H04W 84/20; H04W 84/18; H04W 8/005
USPC .............. 455/41.2, 41.3, 500, 508, 509, 511, 455/518, 519
See application file for complete search history.

(56) References Cited

U.S. PATENT DOCUMENTS

| 2005/0086273 | A1 | 4/2005 | Loebbert et al. |
| 2005/0262216 | A1 | 11/2005 | Kashiwabara et al. |
| 2010/0075605 | A1* | 3/2010 | Yoneda et al. ............... 455/41.3 |
| 2010/0272083 | A1 | 10/2010 | Itoh et al. |
| 2011/0026504 | A1* | 2/2011 | Feinberg ....................... 370/338 |
| 2011/0082905 | A1* | 4/2011 | Wentink et al. ............... 709/205 |
| 2011/0280152 | A1 | 11/2011 | Saito et al. |

FOREIGN PATENT DOCUMENTS

| EP | 1 548 985 A1 | 6/2005 |
| JP | 2010-49158 | 3/2010 |
| WO | WO 03/007552 A2 | 1/2003 |
| WO | WO 2004/109996 A1 | 12/2004 |

OTHER PUBLICATIONS

Extended Search Report issued Jun. 1, 2012 in European Patent Application No. 12158556.6-2412.
U.S. Appl. No. 13/409,437, filed Mar. 1, 2012, Saito, et al.

* cited by examiner

*Primary Examiner* — Ping Hsieh
(74) *Attorney, Agent, or Firm* — Oblon, Spivak, McClelland, Maier & Neustadt, L.L.P.

(57) ABSTRACT

There is provided a wireless communication device including a wireless communication unit configured to receive application information, the application information indicating which of a content providing side or a content user side an application of each of one or more second wireless communication devices is, a setting unit configured to set a parameter indicating a priority to operate as a master unit in accordance with, among the wireless communication device and the second wireless communication device(s), a relationship between the number of providing devices whose applications are content providing sides and the number of user devices whose applications are content user sides, and a control unit configured to control a negotiation with at least one of the second wireless communication devices to determine a wireless communication device to operate as a master unit, using the parameter set by the setting unit.

9 Claims, 12 Drawing Sheets

WIRELESS COMMUNICATION DEVICE, WIRELESS COMMUNICATION METHOD, PROGRAM, AND WIRELESS COMMUNICATION SYSTEM

BACKGROUND

The present disclosure relates to a wireless communication device, a wireless communication method, a program, and a wireless communication system.

In recent years, a wireless LAN (Local Area Network) system typified by IEEE (Institute of Electrical and Electronics Engineers) 802.11 has come into widespread use, replacing wire networks, due to its high degree of freedom of devices. For example, as disclosed in JP 2010-49158A, a wireless LAN system defined by the IEEE 802.11 is composed of a group of wireless communication devices that include an access point operating as a master unit and a plurality of stations operating as slave units, and a plurality of stations are connected to a single access point. In such a wireless LAN system, it is determined that the access point should operate as a master unit and the stations should operate as slave units.

Meanwhile, Wi-Fi Direct defined by the Wi-Fi Alliance is used to form a communication group with a plurality of wireless communication devices directly connected to each other. In forming a communication group, it is determined which of a master unit or a slave unit each wireless communication device should operate. For example, each wireless communication device exchanges a parameter, which indicates the priority to operate as a master unit, with other wireless communication devices and compares the parameters indicating the priority, thereby determining which of a master unit or a slave unit each wireless communication device should operate.

SUMMARY

However, as the aforementioned parameter of each wireless communication device is set by each wireless communication device, there is a possibility that, if three or more wireless communication devices are connected, for example, a communication group may be formed with a topology with an inefficient data path.

In light of the foregoing, it is desirable to provide a novel and improved wireless communication device, wireless communication method, program, and wireless communication system for forming a communication group with a topology with an efficient data path.

According to an embodiment of the present disclosure, there is provided a wireless communication device including a wireless communication unit configured to receive application information, the application information indicating which of a content providing side or a content user side an application of each of one or more nearby wireless communication devices is, a setting unit configured to set a parameter indicating a priority to operate as a master unit in accordance with, among the wireless communication device and the nearby wireless communication device(s), a relationship between the number of providing devices whose applications are content providing sides and the number of user devices whose applications are content user sides, and a control unit configured to control a negotiation with at least one of the nearby wireless communication devices to determine a wireless communication device to operate as a master unit, using the parameter set by the setting unit.

The setting unit may, when the number of the providing devices is smaller than the number of the user devices, set the parameter so that the priority of the providing devices is higher than the priority of the user devices.

The setting unit may, when the number of the providing devices is larger than the number of the user devices, set the parameter so that the priority of the providing devices is lower than the priority of the user devices.

The setting unit may, when the number of the providing devices is equal to the number of the user devices, extract from the nearby wireless communication devices nearby wireless communication devices to be paired with the wireless communication device, and set the parameter in accordance with a relationship between the number of the providing devices and the number of the user devices among the extracted nearby wireless communication devices and the wireless communication device.

Application information of an application that is a content providing side may include information indicating the number of destinations to which the content can be provided, application information of an application that is a content user side may include information indicating the number of sources from which the content can be provided, and the setting unit may, when the number of the providing devices is equal to the number of the user devices among the extracted nearby wireless communication devices and the wireless communication device, set the parameter in accordance with the number of the destinations or the number of the sources indicated by the application information.

The application information may be information about an application that is running on the nearby wireless communication device or an application that the nearby wireless communication device has.

The setting unit may, when the nearby wireless communication device has both a content-providing-side application and a content-user-side application, handle the nearby wireless communication device as a nearby wireless communication device to be paired with the wireless communication device.

According to another embodiment of the present disclosure, there is provided a wireless communication method including receiving, with a wireless communication device, application information, the application information indicating which of a content providing side or a content user side an application of each of one or more nearby wireless communication devices is, setting a parameter indicating a priority to operate as a master unit in accordance with, among the wireless communication device and the nearby wireless communication device(s), a relationship between the number of providing devices whose applications are content providing sides and the number of user devices whose applications are content user sides, and controlling a negotiation with at least one of the nearby wireless communication devices to determine a wireless communication device to operate as a master unit, using the set parameter.

According to still another embodiment of the present disclosure, there is provided a program for causing a computer to function as a wireless communication device, the wireless communication device including a wireless communication unit configured to receive application information, the application information indicating which of a content providing side or a content user side an application of each of one or more nearby wireless communication devices is, a setting unit configured to set a parameter indicating a priority to operate as a master unit in accordance with, among the wireless communication device and the nearby wireless communication device(s), a relationship between the number of providing devices whose applications are content providing sides and the number of user devices whose applications are content user sides, and a control unit configured to control a negotiation with at least one of the nearby wireless communication devices to determine a wireless communication device to operate as a master unit, using the parameter set by the setting unit.

According to yet another embodiment of the present disclosure, there is provided a wireless communication system including a first wireless communication device, and one or more second wireless communication devices. The first wireless communication device includes a wireless communication unit configured to receive application information, the application information indicating which of a content providing side or a content user side an application of each of the one or more second wireless communication devices is, a setting unit configured to set a parameter indicating a priority to operate as a master unit in accordance with, among the first wireless communication device and the second wireless communication device(s), a relationship between the number of providing devices whose applications are content providing sides and the number of user devices whose applications are content user sides, and a control unit configured to control a negotiation with at least one of the second wireless communication devices to determine a wireless communication device to operate as a master unit, using the parameter set by the setting unit.

According to the embodiments of the present disclosure described above, a communication group can be formed with a topology with an efficient data path.

DETAILED DESCRIPTION OF THE EMBODIMENTS

Figure 1:
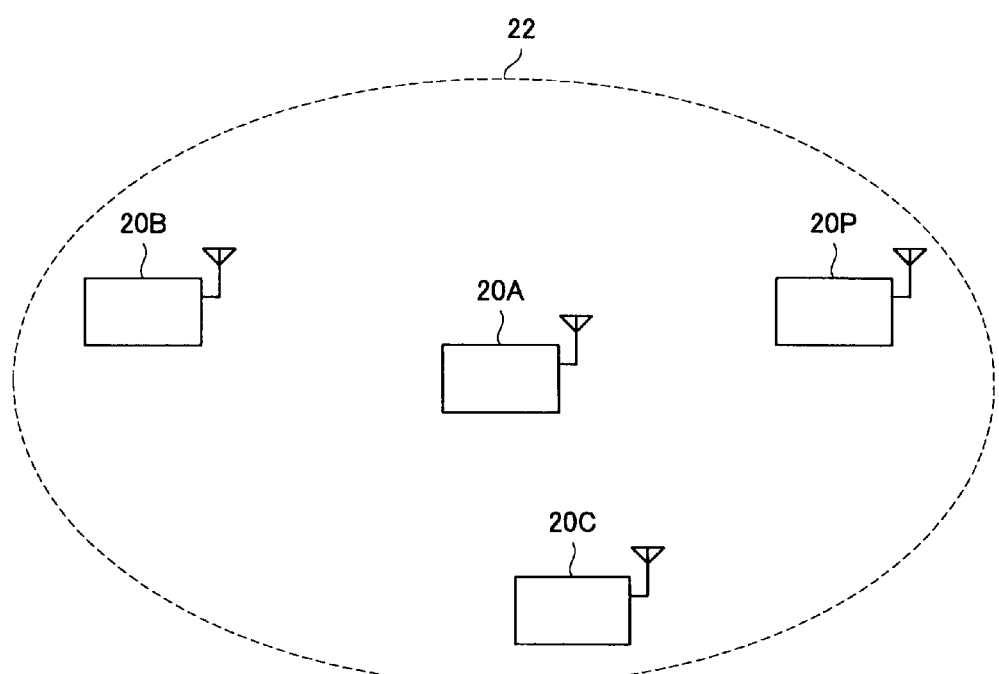
FIG. 1 is an explanatory diagram showing the configuration of a wireless communication system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

In addition, in this specification and the drawings, a plurality of structural elements that have substantially the same function and structure and are denoted by the same reference numerals may be followed by different alphabets for distinction purposes. For example, a plurality of structures that have substantially the same function and structure are distinguished as wireless communication devices 20A, 20B, and 20C as needed. However, when there is no need to particularly distinguish between each of the plurality of structural elements that have substantially the same function and structure, only reference numerals are assigned. For example, when there is no need to particularly distinguish between the wireless communication devices 20A, 20B, and 20C, they are simply referred to as wireless communication devices 20.

The "DETAILED DESCRIPTION OF THE EMBODIMENTS" will be described in accordance with the following order.

1. Configuration of Wireless Communication System
2. Configuration of Wireless Communication Device
3. Operation of Wireless Communication Device
4. Specific Examples of Topology Formation
    4-1. Topology Formation in First Arrangement Example
    4-2. Topology Formation in Second Arrangement Example
    4-3. Topology Formation in Third Arrangement Example
5. Conclusion 1. Configuration of Wireless Communication System FIG. 1 is an explanatory diagram showing the configuration of a wireless communication system in accordance with an embodiment of the present disclosure. The wireless communication system in accordance with an embodiment of the present disclosure includes a plurality of wireless communication devices 20. As an example, in FIG. 1, a wireless communication device 20A and wireless communication devices 20B, 20C, and 20P, which exist within the communicable range of the wireless communication device 20A, are shown as the plurality of wireless communication devices 20.

The wireless communication device 20 can communicate with a nearby wireless communication device 20 not via a dedicated access point, by being directly connected to the nearby wireless communication device 20 and thus forming a communication group therewith.

For example, the wireless communication device 20A determines which of a master unit (group owner) or a slave unit (client) the wireless communication device 20A should operate when forming a communication group, in accordance with Wi-Fi Direct defined by the Wi-Fi Alliance. Specifically, the wireless communication device 20A exchanges parameters indicating the priority to operate as a master unit with the nearby wireless communication device 20B, 20C, or 20P, and compares the parameters indicating the priority, thereby determining which of a master unit or a slave unit the wireless communication device 20A should operate. Then, the wireless communication device 20 forms a communication group with the nearby wireless communication device 20B, 20C, or 20P in accordance with the determined topology (master-slave relationship).

Note that the wireless communication device 20 operating as the master unit connects a plurality of wireless communication devices 20 operating as slave units, and manages and controls the communication performed by the plurality of wireless communication devices 20 operating as the slave units.

Such wireless communication device 20 may be, for example, an information processing device such as a PC (Personal Computer), a home video recorder, a home game machine, a household electrical appliance, a portable phone, a PHS (Personal Handyphone System), a portable music playback device, a portable image processing device, a display device, or an audio output device.

Data exchanged between the wireless communication device 20 and the nearby wireless communication devices 20 may be content data such as audio data of music, lectures, or radio programs; video data of television programs, movies, video programs, photographs, documents, pictures, or charts; games; or software.

In addition, the wireless communication device 20 can function as a providing device having an application that provides content data, a user device having an application that uses (e.g., reproduces) the provided content data, or both of such providing device and user device.

For example, the wireless communication device 20A may function as a music providing device having an application that provides music data, and the wireless communication device 20P may be a music output device having an application that outputs the provided music data. In such a case, the wireless communication device 20A can, by forming a communication group with the wireless communication device 20P, transmit music data to the wireless communication device 20P and cause the wireless communication device 20P to output the music data.

By the way, as a wireless communication device in accordance with a comparative example of the present disclosure determines a topology using a fixed parameter in forming a communication group, there is a possibility that a communication group with an inefficient data path may be formed. Hereinafter, such problem will be described with reference to FIGS. 2 and 3.

Figure 2:
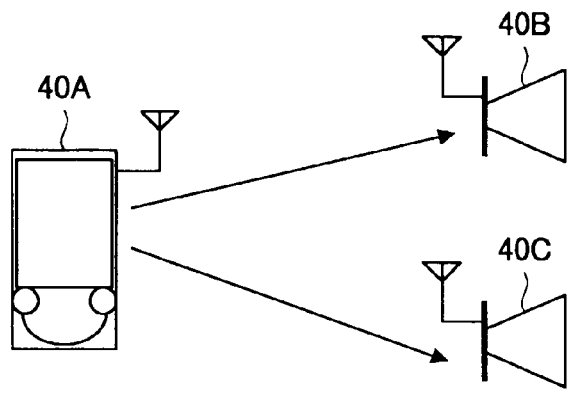
FIG. 2 is an explanatory diagram showing an arrangement example of a wireless communication device in accordance with a comparative example.
Figure 3:
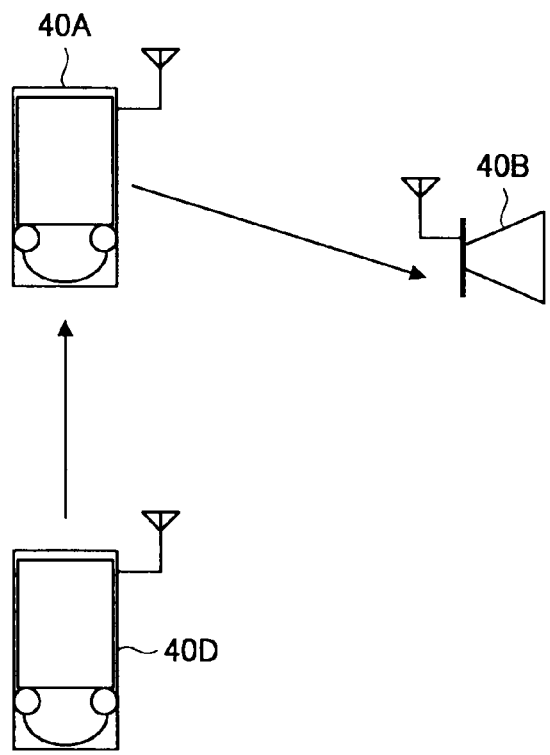
FIG. 3 is an explanatory diagram showing an arrangement example of a wireless communication device in accordance with a comparative example.

FIGS. 2 and 3 are explanatory diagrams each showing an arrangement example of wireless communication devices 40 in accordance with a comparative example. In the arrangement example shown in FIG. 2, a wireless communication device 40A, which is a music providing device, first discovers wireless communication devices 40B and 40C, which are music output devices, by searching for nearby devices. Next, the wireless communication device 40A performs a negotiation for determining the master-slave relationship with the wireless communication device 40B, and forms a communication group with the wireless communication device 40B in accordance with the determined master-slave relationship.

Herein, a parameter of the wireless communication device 40A indicating the priority to be a master unit is K1, and a parameter of each of the wireless communication devices 40B and 40C indicating the priority to be a master unit is K2. In the negotiation for determining the master-slave relationship, it is determined that a wireless communication device 40 having a larger parameter value has a function of a master unit. Therefore, when K1>K2, a communication group is formed with the wireless communication device 40A serving as a master unit and the wireless communication device 40B serving as a slave unit.

After that, when the wireless communication device 40C joins the communication group, it becomes possible for the wireless communication device 40A to transmit music data to the wireless communication devices 40B and 40C and cause the plurality of wireless communication devices 40 to output the music data, as shown in FIG. 2.

However, as shown in FIG. 3, in the arrangement example in which a plurality of music providing devices (wireless communication devices 40A and 40D) and a single music output device (a wireless communication device 40B) exist, a communication group with an inefficient data path is formed when K1>K2.

Specifically, first, the wireless communication device 40A determines that it should operate as a master unit by exchanging parameters with the wireless communication device 40B, and forms a communication group. Therefore, the wireless communication device 40D, in order to output music from the wireless communication device 40B, first connects, as a slave unit, to the wireless communication device 40A in the communication group, and then transmits music data to the wireless communication device 40B via the wireless communication device 40A. At this time, music data is inefficiently transmitted using a plurality of data paths, i.e., a data path between the wireless communication devices 40D and 40A and a data path between the wireless communication devices 40A and 40B.

As described above, when the wireless communication device 40 determines the master-slave relationship using a fixed parameter, there is a possibility that an optimum data path may not be obtained for an application that is used after a connection is established.

In view of the foregoing circumstances, the inventors have arrived at creating the wireless communication device 20 in accordance with an embodiment of the present disclosure. The wireless communication device 20 in accordance with an embodiment of the present disclosure can form a communication group with a topology with an efficient data path for an application used. Hereinafter, such wireless communication device 20 in accordance with an embodiment of the present disclosure will be described in detail.

2. Configuration of Wireless Communication Device (Hardware Configuration)

Figure 4:
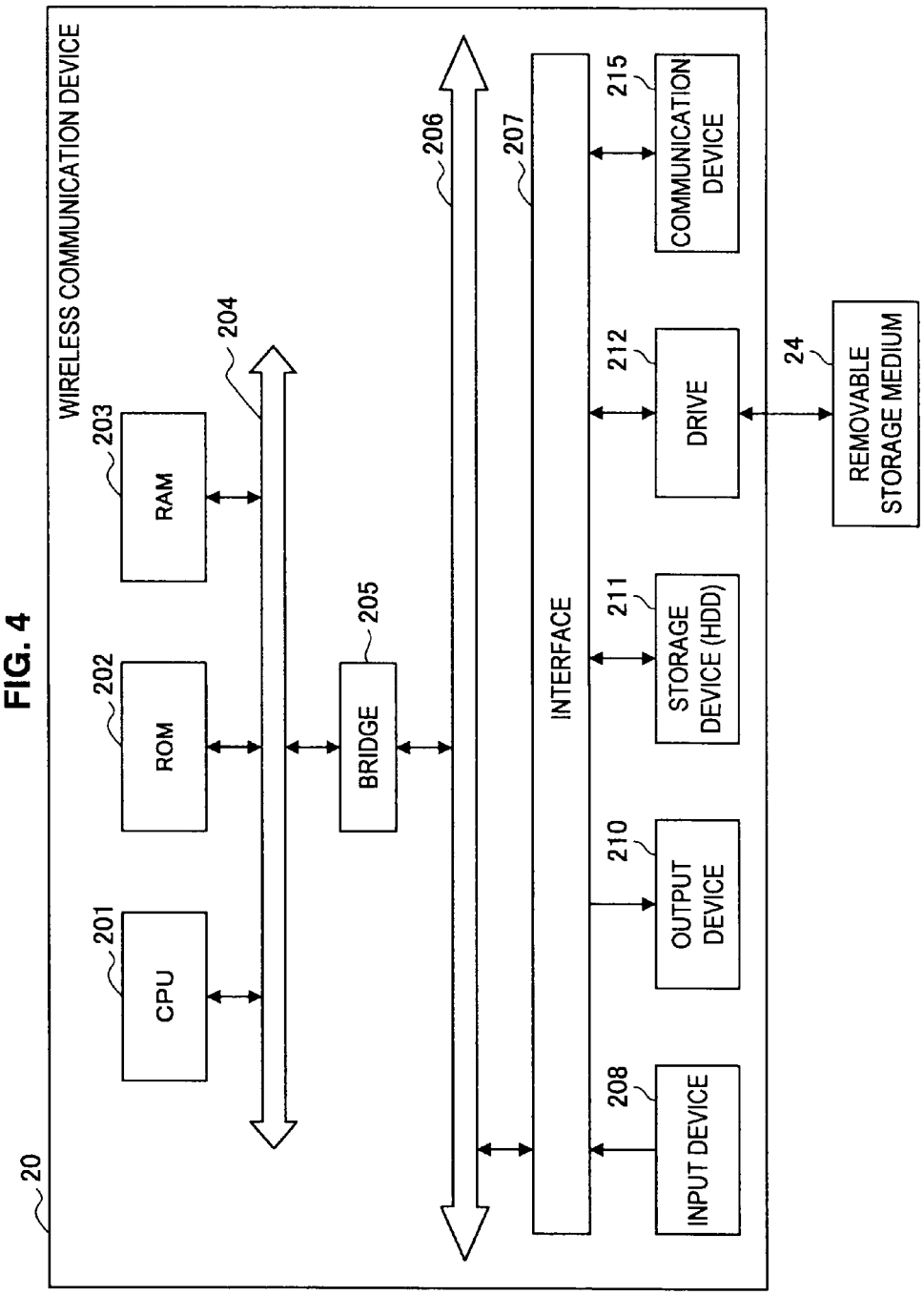
FIG. 4 is a block diagram showing the hardware configuration of a wireless communication device in accordance with an embodiment of the present disclosure.

FIG. 4 is a block diagram showing the hardware configuration of the wireless communication device 20 in accordance with an embodiment of the present disclosure. The wireless communication device 20 includes a CPU (Central Processing Unit) 201, ROM (Read Only Memory) 202, RAM (Random Access Memory) 203, and a host bus 204. The wireless communication device 20 also includes a bridge 205, an external bus 206, an interface 207, an input device 208, an output device 210, a storage device (HDD) 211, a drive 212, and a communication device 215.

The CPU 201 functions as an arithmetic processing unit and a control unit, and controls the entire operation in the wireless communication device 20 in accordance with various programs. The CPU 201 may be a microprocessor. The ROM 202 stores programs, operation parameters, and the like used by the CPU 201. The RAM 203 temporarily stores programs used during the execution of the CPU 201, parameters that change as appropriate during the execution, and the like. Such units are mutually connected via the host bus 204 including a CPU bus or the like.

The host bus 204 is connected to the external bus 206 such as a PCI (Peripheral Component Interconnect/Interface) bus via the bridge 205. Note that the host bus 204, the bridge 205, and the external bus 206 need not be arranged separately, and the functions of such components may be integrated into a single bus.

The input device 208 includes an input means for a user to input information, such as a mouse, a keyboard, a touch panel, a button, a microphone, a switch, or a lever; an input control circuit that generates an input signal on the basis of a user input and outputs the signal to the CPU 201; and the like. A user of the wireless communication device 20 can input various data to the wireless communication device 20 or instruct the wireless communication device 20 to perform a processing operation by operating the input device 208.

The output device 210 includes a display device such as, for example, a CRT (Cathode Ray Tube) display device, a liquid crystal display (LCD) device, an OLED (Organic Light Emitting Diode) device, or a lamp. Further, the output device 210 includes an audio output device such as a speaker and a headphone. The output device 210 outputs the reproduced content, for example. Specifically, the display device displays various information such as reproduced video data by means of text or images. Meanwhile, the audio output device converts the reproduced audio data or the like into audio and outputs the audio.

The storage device 211 is a device for storing data, constructed as an example of a storage unit of the wireless communication device 20 in accordance with this embodiment. The storage device 211 may include a storage medium, a recording device that records data on the storage medium, a reading device that reads data from the storage medium, a deletion device that deletes data recorded on the storage medium, and the like. The storage device 211 includes, for example, a HDD (Hard Disk Drive). The storage device 211 stores programs and various data that drive the hard disk and are executed by the CPU 201.

The drive 212 is a reader/writer for a storage medium, and is incorporated in or externally attached to the wireless communication device 20. The drive 212 reads information recorded on a removable storage medium 24 such as a magnetic disk, an optical disc, a magnetooptical disk, or semiconductor memory that is mounted, and outputs the information to the RAM 203. The drive 212 can also write information to the removable storage medium 24.

The communication device 215 is, for example, a communication interface including a communication device or the like for connection to a nearby wireless communication device 20. The communication device 215 may be any of a communication device supporting a wireless LAN (Local Area Network), a communication device supporting LTE (Long Term Evolution), or a wire communication device that performs wire communication.

(Functional Configuration)

Figure 5:
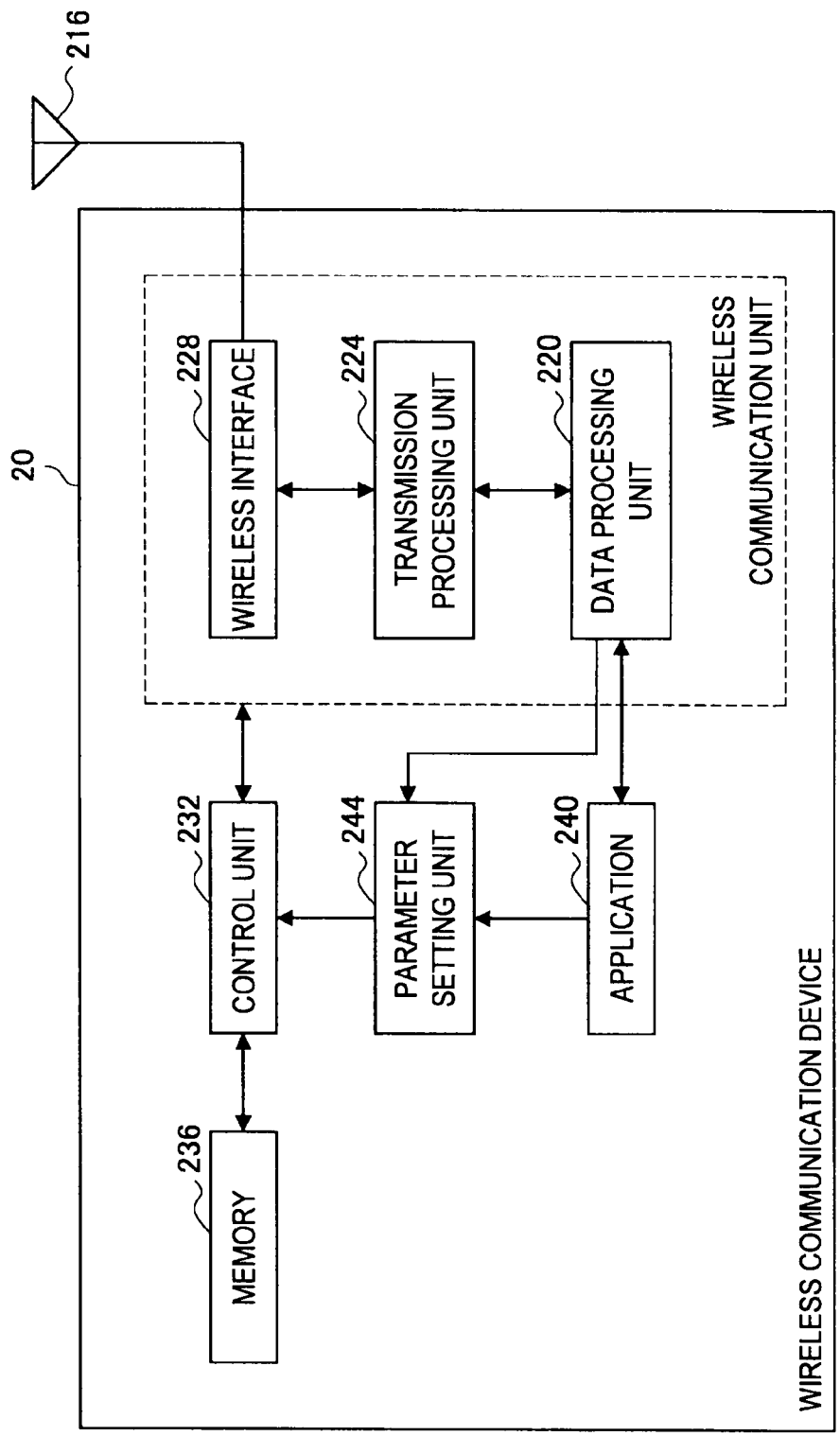
FIG. 5 is a functional block diagram showing the configuration of a wireless communication device in accordance with an embodiment of the present disclosure.

FIG. 5 is a functional block diagram showing the configuration of the wireless communication device 20 in accordance with an embodiment of the present disclosure. As shown in FIG. 5, the wireless communication device 20 in accordance with this embodiment has a wireless communication unit including an antenna 216, a data processing unit 220, a transmission processing unit 224, and a wireless interface 228; a control unit 232; memory 236; an application 240; and a parameter setting unit 244.

In transmission, the data processing unit 220, in response to a request from a higher layer such as the control unit 232 or the application 240, for example, creates various data frames and data packets and supplies them to the transmission processing unit 224. The transmission processing unit 224, in transmission, performs processes, e.g., addition of various data headers or an error detection code such as FCS (Frame Check Sequence) to the packets generated by the data processing unit 220, and provides the processed data to the wireless interface unit 228. The wireless interface unit 228 generates a modulated signal in the carrier frequency band from the data received from the transmission processing unit 224, and transmits the modulated signal as a radio signal from the antenna 216.

Meanwhile, in performing a receiving operation, the wireless interface unit 228 decodes various data frames by down-converting radio signals received by the antenna 216 and converting them into bit strings. The transmission processing unit 224 analyzes headers added to the various data frames supplied from the wireless interface unit 228, and upon checking that the data frames contain no error on the basis of error detection codes, supplies the various data frames to the data processing unit 220. The data processing unit 220 processes and analyzes the various data frames and data packets supplied from the transmission processing unit 224.

The control unit 232 controls the receiving operation and the transmission operation of each of the data processing unit 220, the transmission processing unit 224, and the wireless interface 228. For example, the control unit 232 performs an operation such as determination of the frequency used, creation of a control message and transmission instruction thereof, analysis of a control message, and connection process control. Note that when the wireless communication device 20 can operate as both a slave unit and a master unit, the control message may be, for example, annunciation information such as a beacon, a beacon reception response, or a probe request or a probe response defined by Wi-Fi Direct.

In addition, the control unit 232 performs creation and transmission instruction of a service discovery, which includes application information about the application 240, and a service discovery response. The application information may include information indicating if the application 240 is the content data providing side or user side, information indicating the number of sources that can provide content data, and information indicating the number of destinations that can receive content data.

Note that in this embodiment, a public action frame is used as each of a service discovery query and a service discovery response. A public action frame is a type of an action frame, which is defined/extended by the IEEE 802.11 as a management frame that can be transmitted before wireless communication devices are connected. The detailed structures of such service discovery query and service discovery response will be described with reference to FIGS. 6 and 7.

In addition, the control unit 232 controls a negotiation for determining the master-slave relationship with a nearby wireless communication device 20, using a parameter set by the parameter setting unit 244. Specifically, if the parameter set by the parameter setting unit 244 is larger than that of the nearby wireless communication device 20, the control unit 232 determines that the wireless communication device 20 should operate as a master unit. Meanwhile, if the parameter set by the parameter setting unit 244 is smaller than that of the nearby wireless communication device 20, the control unit 232 determines that the wireless communication device 20 should operate as a slave unit. Then, the control unit 232 controls communication for forming a communication group with the nearby wireless communication device 20 in accordance with the determined master-slave relationship (topology).

The memory 236 has a function of a work area for data processing performed by the control unit 232, and a function of a storage medium for storing various data. The memory 236 may be a storage medium such as nonvolatile memory, a magnetic disk, an optical disk, or a MO (Magnetic Optical) disk. The nonvolatile memory may be, for example, EEPROM (Electrically Erasable Programmable Read-Only Memory) or EPROM (Erasable Programmable ROM). The magnetic disk may be a hard disk, a disk-shaped magnetic body, or the like. The optical disc may be a CD (Compact Disc), DVD-R (Digital Versatile Disc Recordable), BD (Blu-Ray Disc™), or the like.

The application 240 is an application that is being started or is started after a communication group is formed. For example, when the application 240 is the content data providing side, the application 240 may reproduce content data stored in the wireless communication device 20, and provide the reproduced signal of the content data to a nearby wireless communication device. Meanwhile, when the application 240 is the content data user side, the application 240 may output a reproduced signal of the provided content data to a display device, an audio output device (e.g., a speaker), or the like.

The parameter setting unit 244 sets a parameter for determining the master-slave relationship on the basis of the application information of the application 240 and application information of a nearby wireless communication devices 20 supplied by the data processing unit 220. Schematically speaking, the parameter setting unit 244 sets a parameter in accordance with, among the wireless communication device 20 and the nearby wireless communication devices 20, the relationship between the number of providing devices whose applications are content data providing sides and the number of user devices whose applications are content data user sides. Such parameter setting will be described in detail with reference to FIG. 9 and the section: "4. Specific Examples of Topology Formation."

(Frame Structure)

Hereinafter, the structures of a service discovery query and a service discovery response for exchanging application information will be described with reference to FIGS. 6 and 7.

Figure 6:
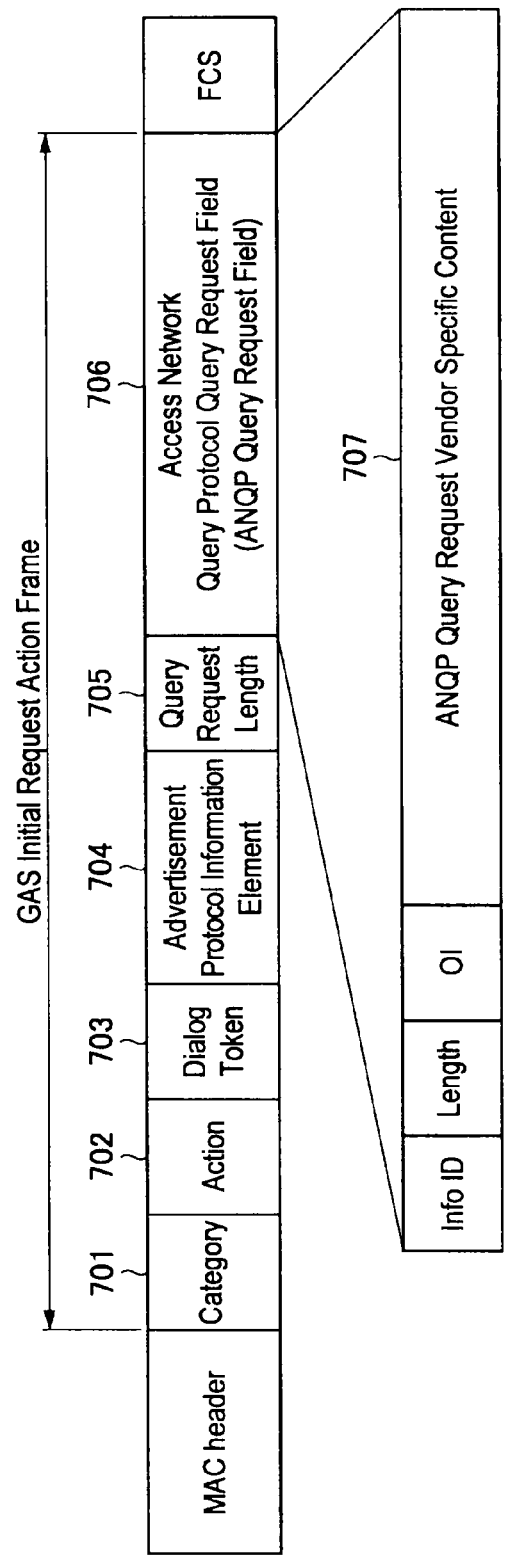
FIG. 6 is an explanatory diagram showing the structure of a service discovery query.

FIG. 6 is an explanatory diagram showing the structure of a service discovery query. As shown in FIG. 6, the service discovery query includes a MAC header, a GAS initial request action frame, and FCS.

The GAS initial request action frame is defined as a frame transmitted for requesting another wireless communication device to perform wireless communication, and includes a category field 701, an action field 702, a dialog token field 703, an advertisement protocol information element field 704, a query request length field 705, and an ANQP query request field 706.

In the category field 701, information that specifies a public action frame is stored as the category of a management frame defined by the IEEE 802.11. That is, the category field 701 shows that the service discovery query is a public action frame.

In the action field 702, information that specifies a GAS initial request action frame is stored as the action type of the public action frame. That is, the action field 702 shows that the service discovery query is a GAS initial request action frame.

In the dialog token field 703, information for uniquely identifying the service discovery query is stored. Identification information, address information, and response request information are stored in this dialog token field 703, for example.

In the advertisement protocol information element field 704, information indicating ANQP (Access Network Query Protocol) is stored.

In the query request length field 705, information indicating the length of the ANQP query request field 706 is stored.

In the ANQP query request field 706, information indicating a service protocol type requested by the service discovery query is stored. Specifically, the ANQP query request field 706 includes an information ID (Info ID) field, a length field, an OI field, and an ANQP query request vendor specific content field 707.

Application information about the application 240 is stored in this ANQP query request vendor specific content field 707.

Figure 7:
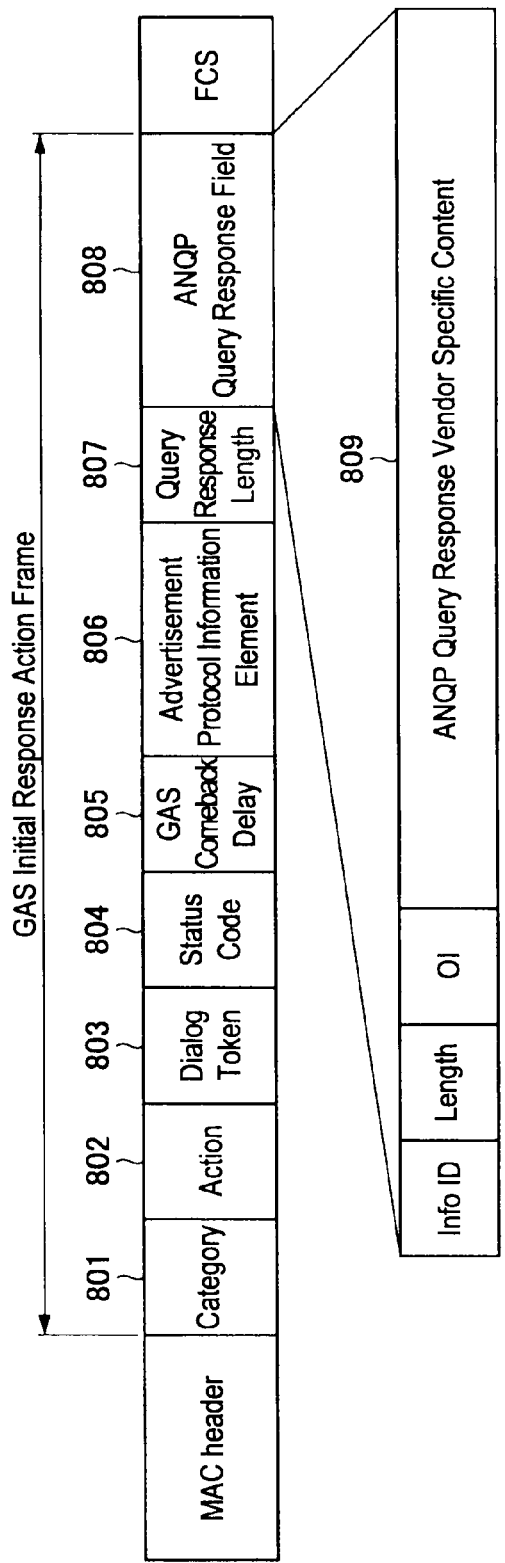
FIG. 7 is an explanatory diagram showing the structure of a service discovery response.

FIG. 7 is an explanatory diagram showing the structure of a service discovery response. The service discovery response includes a MAC header, a GAS initial response action frame, and FCS.

The GAS initial response action frame is defined as a frame transmitted to respond to a wireless communication request from another wireless communication device, and includes a category field 801, an action field 802, a dialog token field 803, a status code field 804, a GAS comeback delay field 805, an advertisement protocol information element field 806, a query response length field 807, and an ANQP query response field 808.

In the category field 801, information similar to that in the category frame 701 is stored. In the action field 802, information that specifies a GAS initial response action frame is stored as the action type of the public action frame. That is, the action field 802 shows that the service discovery response is a GAS initial response action frame.

In the dialog token field 803, information for uniquely identifying the service discovery response is stored. Identification information, address information, and response information are stored in this dialog token field 803, for example.

In the status code field 804, information indicating a status defined by the IEEE 802.11 is stored.

In the GAS comeback delay field 805, information indicating the delay time of the service discovery response is stored.

In the advertisement protocol information element field 806, information similar to that in the advertisement protocol information element field 704 is stored.

In the query response length field 807, information indicating the length of the ANQP query response field 808 is stored.

In the ANQP query response field 808, information indicating a service protocol type requested by the service discovery response is stored. Specifically, the ANQP query response field 808 includes an information ID field, a length field, an OI field, and an ANQP query response vendor specific content field 809.

Application information about the application 240 is stored in this ANQP query response vendor specific content field 809.

3. Operation of Wireless Communication Device

Heretofore, the configuration of the wireless communication device 20 in accordance with an embodiment of the present disclosure has been described. Next, the operation of the wireless communication device 20 in accordance with an embodiment of the present disclosure will be described with reference to FIGS. 8 and 9.

Figure 8:
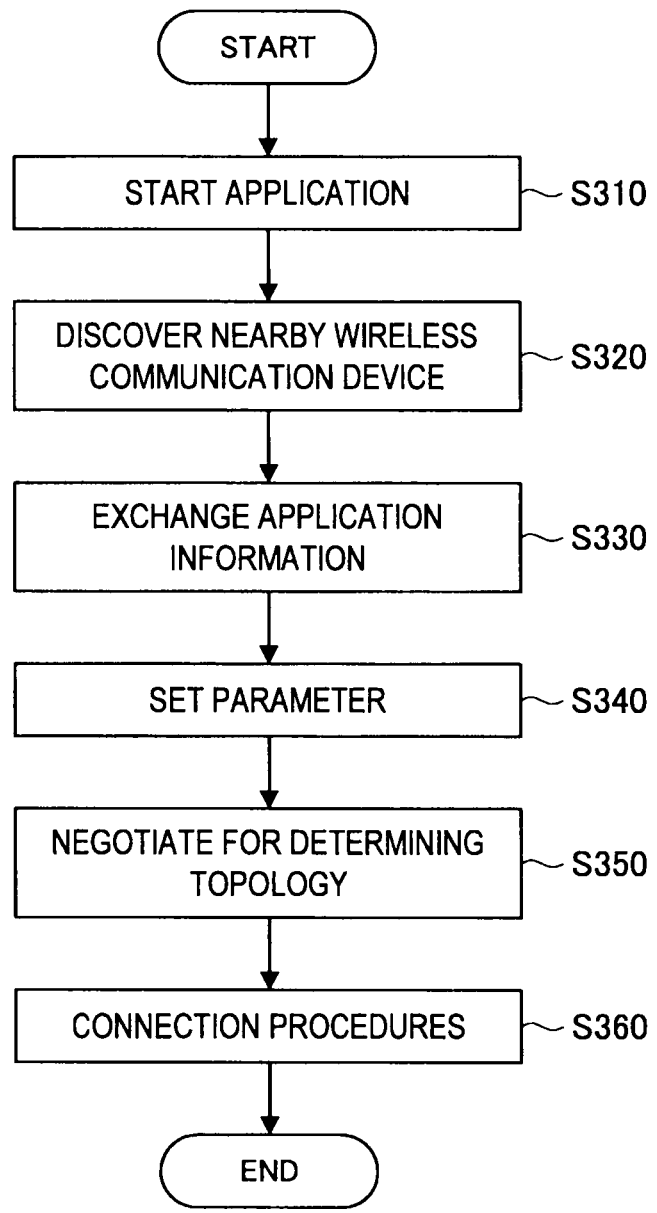
FIG. 8 is a flowchart showing the operation of a wireless communication device in accordance with an embodiment of the present disclosure.

FIG. 8 is a flowchart showing the operation of the wireless communication device 20 in accordance with an embodiment of the present disclosure. As shown in FIG. 8, when the application 240 of the wireless communication device 20 is started (S310), the control unit 232 discovers a nearby wireless communication device 20 by controlling Device Discovery that searches for nearby devices (S320).

Then, the control unit 232 exchanges application information with a nearby wireless communication 20 through Service Discovery (S330). Specifically, the control unit 232 transmits a service discovery query including application information about the application 240 from the wireless communication unit, and receives a service discovery response including application information from the nearby wireless communication device 20.

Next, the parameter setting unit 244 sets a parameter for determining the master-slave relationship on the basis of the application information of the application 240 and the application information of the nearby wireless communication device 20 exchanged in S330 (S340).

Then, the control unit 232 controls a negotiation for determining a topology with the nearby wireless communication device 20 using the parameter set by the parameter setting unit 244 (S350). Specifically, if the parameter set by the parameter setting unit 244 is larger than the parameter of the nearby wireless communication device 20, the control unit 232 determines that the wireless communication device 20 should operate as a master unit. Meanwhile, if the parameter set by the parameter setting unit 244 is smaller than the parameter of the nearby wireless communication device 20, the control unit 232 determines that the wireless communication device 20 should operate as a slave unit.

After that, the control unit 232 controls the connection procedures for forming a communication group with the nearby wireless communication device 20 in accordance with the determined master-slave relationship (topology) (S360).

Figure 9:
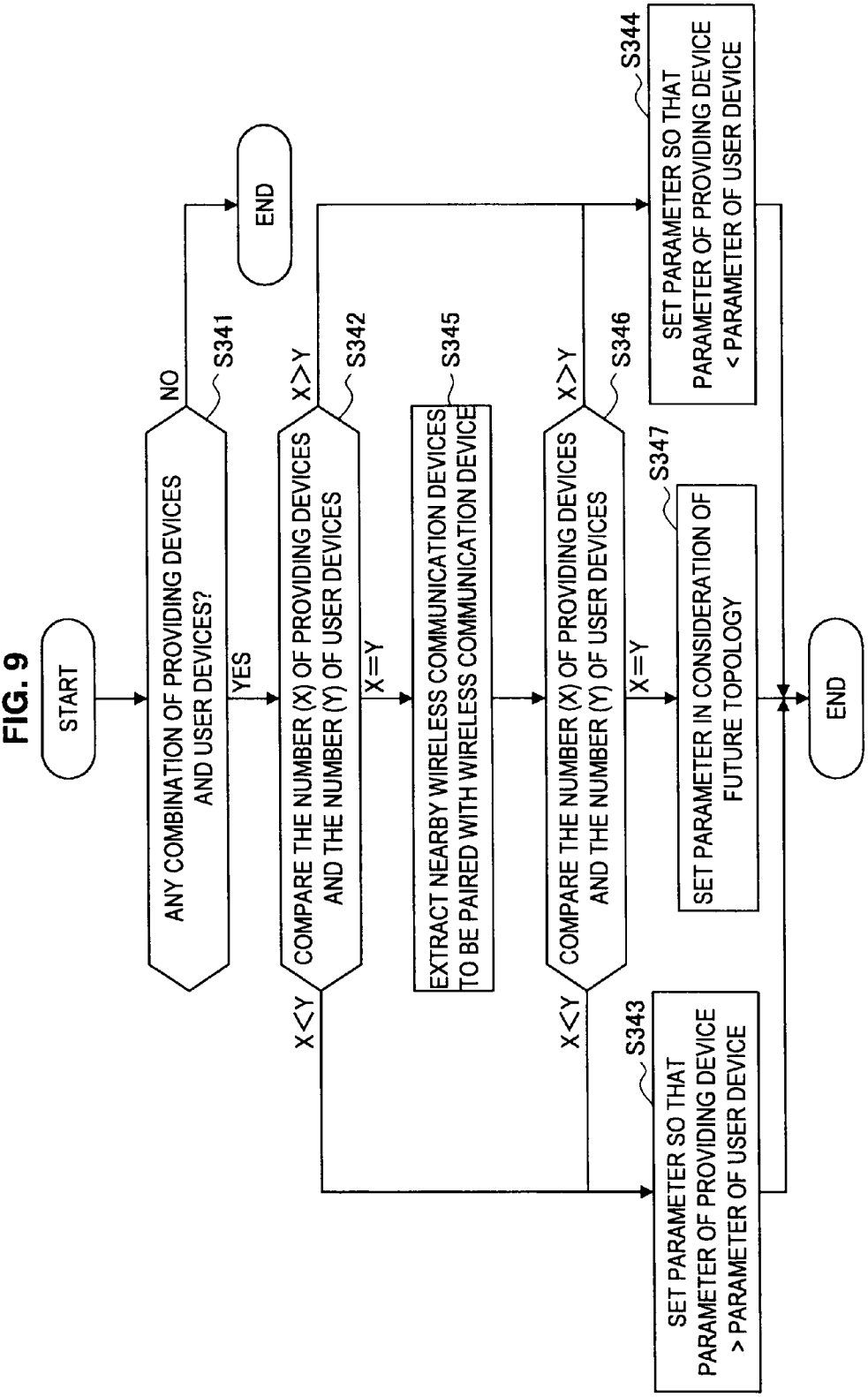
FIG. 9 is a flowchart showing the details of a parameter setting process.

FIG. 9 is a flowchart showing the details of the parameter setting process. As shown in FIG. 9, the parameter setting unit 244 determines if, among the wireless communication device 20 and the nearby wireless communication devices 20, there exits any combination of providing devices and user devices (S341). If there exists no combination of providing devices and user devices (S341/no), that is, if there exist only providing devices or only user devices, the parameter setting unit 244 terminates the process. In such a case, the control unit 232 may either control a negotiation for determining a topology using a default parameter, or not form a communication group.

Note that if there exits no combination of providing devices and user devices, the parameter setting unit 244 may either set a parameter in accordance with an instruction from a higher layer or a user, or wait until a combination of a providing device and a user device appears.

If there exists a nearby wireless communication device 20 that can operate as both a providing device and a user device, the parameter setting unit 244 may handle such a nearby wireless communication device 20 as a device to be paired with the application 240. When the wireless communication device 20 forms a communication group with such a nearby wireless communication device 20, the nearby wireless communication device 20 operates as a device paired with the application 240. Thus, such handling is appropriate for a comparison process in step S342.

Meanwhile, when there exist combinations of providing devices and user devices (S341/yes), the parameter setting unit 244 compares the number (X) of the providing devices and the number (Y) of the user devices (S342).

Then, when X<Y, the parameter setting unit 244 sets a parameter of the wireless communication device 20 so that the parameters of the providing devices become larger than the parameters of the user devices (S343). For example, the parameter setting unit 244 may, when the wireless communication device 20 is a providing device, set a parameter that is larger than a median value or a reference value (default value). Conversely, the parameter setting unit 244 may, when the wireless communication device 20 is a user device, set a parameter that is smaller than the median value or the reference value (default value). By performing similar parameter setting in the nearby wireless communication devices 20, it becomes possible to set the parameters of the providing devices to be larger than the parameters of the user devices.

According to such a configuration, when the number of the providing devices is smaller than that of the user devices, it is possible to operate the providing devices as master units. Consequently, a possibility that an inefficient data path may be formed can be suppressed.

When X>Y, the parameter setting unit 244 sets a parameter of the wireless communication device 20 so that the parameters of the providing devices become smaller than the parameters of the user devices (S344). For example, the parameter setting unit 244 may, when the wireless communication device 20 is a providing device, set a parameter that is smaller than a median value or a reference value (default value). Conversely, the parameter setting unit 244 may, when the wireless communication device 20 is a user device, set a parameter that is larger than the median value or the reference value (default value). By performing similar parameter setting in the nearby wireless communication devices 20, it becomes possible to set the parameters of the providing devices to be smaller than the parameters of the user devices.

According to such a configuration, when the number of the providing devices is larger than that of the user devices, it is possible to operate the user devices as master units. Consequently, an efficient data path can be formed as described with reference to FIGS. 10 and 11, for example.

Meanwhile, when X=Y, the parameter setting unit 244 extracts nearby wireless communication devices 20 to be paired with the wireless communication device 20 (S345). For example, the parameter setting unit 244, when the wireless communication device 20 is a providing device, extracts nearby wireless communication devices 20 that are user devices. Likewise, the parameter setting unit 244, when the wireless communication device 20 is a user device, extracts nearby wireless communication devices 20 that are providing devices. According to such a configuration, it is possible to determine a topology by putting weight on the presence of nearby wireless communication devices 20 that are to be paired with the wireless communication device 20.

Next, the parameter setting unit 244 again compares, among the wireless communication device 20 and the extracted nearby wireless communication devices 20, the number (X) of the providing devices and the number (Y) of the user devices (S346).

Then, when X<Y, the parameter setting unit 244 sets a parameter of the wireless communication device 20 so that the parameters of the providing devices become larger than the parameters of the user devices (S343). Meanwhile, when X>Y, the parameter setting unit 244 sets a parameter of the wireless communication device 20 so that the parameters of the providing devices become smaller than the parameters of the user devices (S344).

Meanwhile, when X=Y, the parameter setting unit 244 sets a parameter in consideration of nearby wireless communication devices 20, which may join the communication group in future, and a future topology.

For example, suppose a case where the wireless communication device 20 is a providing device that is able to provide content data to a plurality of destinations, and nearby wireless communication devices 20 are user devices that are able to receive content data provided only from a single source. Then, a case is supposed where the wireless communication device 20 will transmit content data to the plurality of nearby wireless communication devices 20 in future. In that case, it would be efficient if the wireless communication device 20 is able to transmit content data directly to the plurality of nearby wireless communication devices 20. Therefore, the parameter setting unit 244 may, in order for the wireless communication device 20 to be able to operate as a master unit, set a parameter of the wireless communication device 20 to be larger than those of the nearby wireless communication devices 20.

Meanwhile, suppose a case where the wireless communication device 20 is a providing device that is able to provide content data only to a single destination, and a nearby wireless communication device 20 is a user device that is able to receive content data provided from a plurality of sources. Then, a case is supposed where the nearby wireless communication device 20 will receive content data from a plurality of sources including the wireless communication device 20 in future. In that case, it would be efficient if the plurality of sources are able to transmit content data directly to the nearby wireless communication device 20. Therefore, the parameter setting unit 244 may, in order for the nearby wireless communication device 20 to be able to operate as a master unit, set a parameter of the wireless communication device 20 to be smaller than the parameter of the nearby wireless communication device 20.

Note that when the wireless communication device 20 is able to provide content data only to a single destination, and a nearby wireless communication device 20 is also able to receive content data only from a single source, the parameter setting unit 24 may set a default parameter. Alternatively, the parameter setting unit 244 may set a parameter in accordance with other information of the wireless communication device 20 or a user instruction.

4. Specific Examples of Topology Formation

Heretofore, the configuration and operation of the wireless communication device 20 in accordance with an embodiment of the present disclosure have been described. Next, specific examples of topology formation by the aforementioned wireless communication device 20 will be described with reference to FIGS. 10 to 16. Note that wireless communication devices 20 on the music providing side will be referred to as music providing devices 20 (A, B, C), and wireless communication devices 20 on the music output side will be referred to as music output devices 20 (P, Q, R). Although an example in which the exchanged data is music data is described below, the exchanged content data is not limited to music data. For example, the providing device may also provide video data, and the user device may also display the provided video data.

(4-1. Topology Formation in First Arrangement Example)

Figure 10:
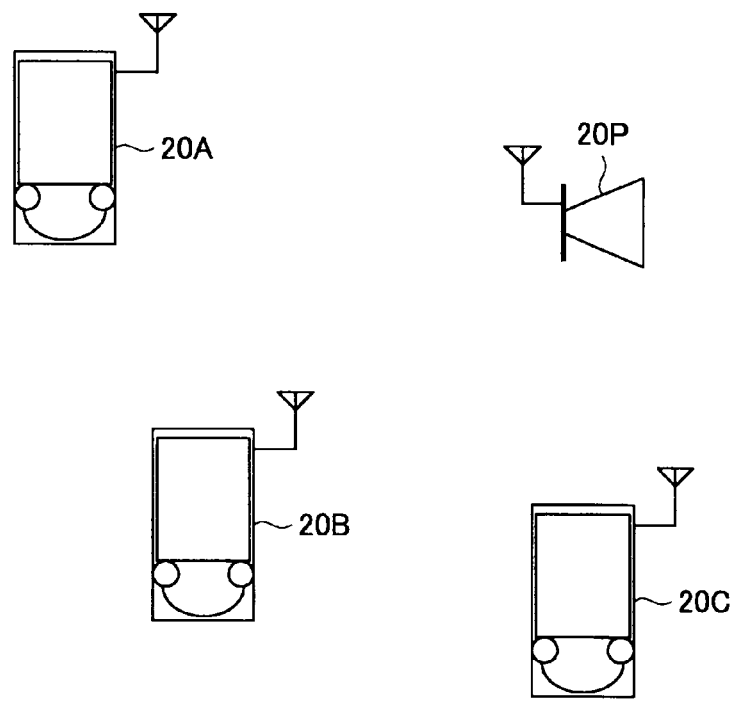
FIG. 10 is an explanatory diagram showing a first arrangement example of a plurality of wireless communication devices.

FIG. 10 is an explanatory diagram showing a first arrangement example of a plurality of wireless communication devices 20. As shown in FIG. 10, in the first arrangement example, the music providing devices 20A, 20B, and 20C and the music output device 20P are arranged within the mutually communicable range, for example, within the same home or the same vehicle. Herein, it is assumed that each of the music providing devices 20A, 20B, and 20C is able to provide music data only to a single destination, and the music output device 20P is able to receive music data provided from a plurality of sources.

In the first arrangement example, the music providing device 20A, upon starting the application 240 as shown in FIG. 8 (S310), first discovers the nearby music providing devices 20B and 20C and the music output device 20P through Device Discovery (S320). Then, the music providing device 20A exchanges application information with the nearby music providing devices 20B and 20C and the music output device P through Service Discovery (S330).

After that, the music providing device 20A, as shown in FIG. 9, determines if there exists any combination of providing devices and user devices (S341). In the first arrangement example, the music providing devices 20A to 20C and the music output device 20P exist. Thus, the music providing device 20A determines that there exist combinations of providing devices and user devices.

Then, the music providing device 20A compares the number (X) of the providing devices and the number (Y) of the user devices (S342). In the first arrangement example, the number (X) of the providing devices is "3," and the number of the user devices is "1." Thus, X>Y. Therefore, the parameter setting unit 244 of the music providing device 20A sets a parameter of the music providing device 20A so that the parameter of the music providing device 20A becomes smaller than the parameter of the music output device 20P (S344). For example, the parameter setting unit 244 of the music providing device 20A may set a parameter that is smaller than a median value or a reference value. In the music providing devices 20B and 20C, parameters are set in a similar way. Meanwhile, the parameter setting unit 244 of the music output device 20P may set a parameter (e.g., a maximum value) that is larger than the median value or the reference value.

The music providing device 20A and the music output device 20P, through a negotiation using the set parameters, determine that the music providing device 20A should operate as a slave unit and the music output device 20P should operate as a master unit (S350). Then, the music providing device 20A and the music output device 20P form a communication group in accordance with the determined topology (the music providing device 20A=a slave unit, the music output device 20P=a master unit).

Figure 11:
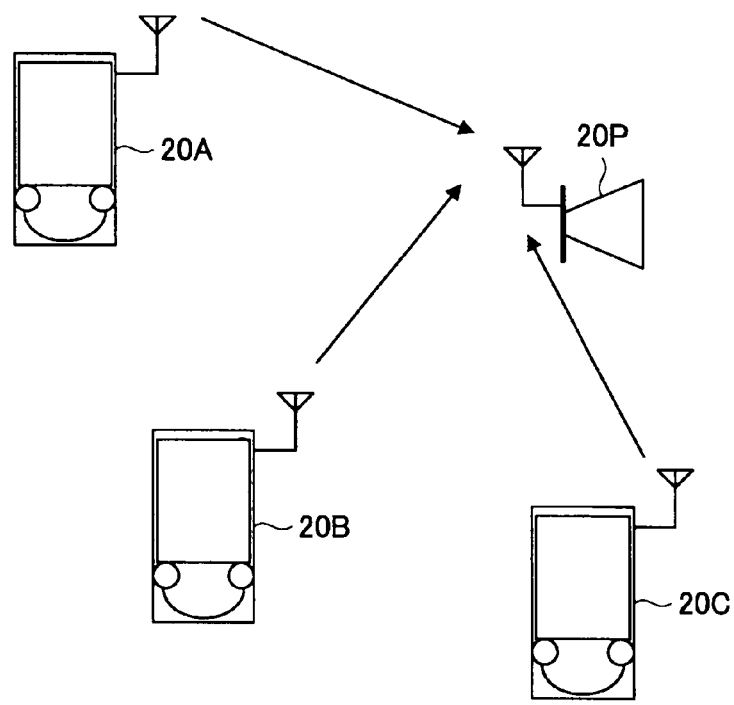
FIG. 11 is an explanatory diagram showing a topology formed in the first arrangement example.

By forming a communication group with such a topology, it becomes possible for each of the music providing devices 20B and 20C to join the communication group as a slave unit of the music output device 20P either voluntarily or as guided by the music output device 20P as shown in FIG. 11. Therefore, the music providing devices 20B and 20C are able to transmit music data directly to the music output device 20P and cause the music output device 20P to output music. The topology shown in FIG. 11 is advantageous in that the data path is more efficient than that of the topology in accordance with the comparative example shown in FIG. 3, for example.

Note that in the communication group having the topology shown in FIG. 11, for example, the music providing devices 20A to 20C may sequentially transmit music data to the music output device 20P, and the music output device 20P may sequentially output the music data provided by the music providing devices 20A to 20C. Alternatively, when the exchanged data is video data, the plurality of providing devices may simultaneously transmit video data to the user device, and the user device may simultaneously display the provided data in different areas.

(4-2. Topology Formation in Second Arrangement Example)

Figure 12:
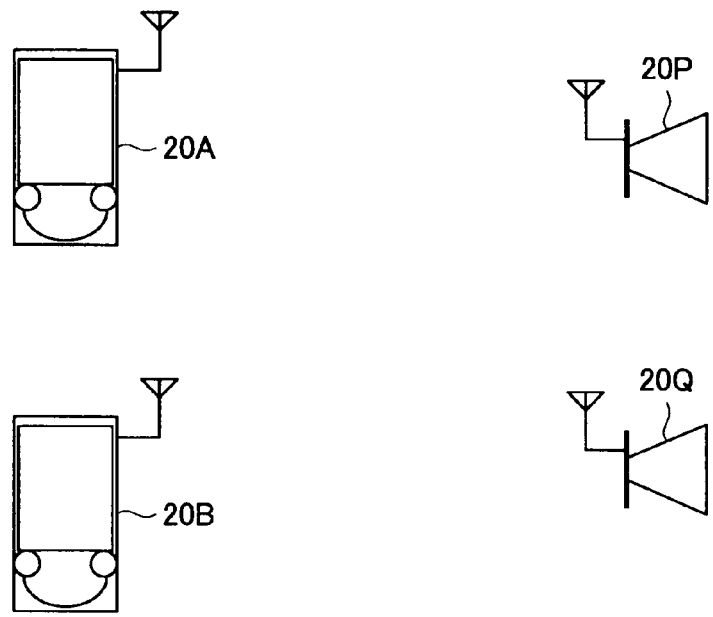
FIG. 12 is an explanatory diagram showing a second arrangement example of a plurality of wireless communication devices.

FIG. 12 is an explanatory diagram showing a second arrangement example of a plurality of wireless communication devices 20. As shown in FIG. 12, in the second arrangement example, music providing devices 20A and 20B and music output devices 20P and 20Q are arranged within the mutually communicable range. Herein, each of the music providing devices 20A and 20B is able to provide music data to a plurality of destinations, and each of the music output devices 20P and 20Q is able to receive content data only from a single source.

In the second arrangement example, the music providing device 20A, upon starting the application 240 as shown in FIG. 8 (S310), discovers the nearby music providing device 20B and the music output devices 20P and 20Q through Device Discovery (S320). Then, the music providing device 20A exchanges application information with the nearby music providing device 20B and the music output devices 20P and 20Q through Service Discovery (S330).

Then, the music providing device 20A determines if there exists any combination of providing devices and user devices as shown in FIG. 9 (S341). In the second arrangement example, the music providing devices 20A and 20B and the music output devices 20P and 20Q exist. Thus, the music providing device 20A determines that combinations of the providing devices and the user devices exist.

Then, the music providing device 20A compares the number (X) of the providing devices and the number (Y) of the user devices (S342). In the second arrangement example, the number (X) of the providing devices is "2" and the number (Y) of the user devices is "2." Thus, X=Y. Therefore, the parameter setting unit 244 of the music providing device 20A extracts the music output devices 20P and 20Q to be paired with the music providing device 20A (S345).

Next, the parameter setting unit 244 of the music providing device 20A again compares the number (X) of the providing devices and the number (Y) of the user devices among the music providing device 20A and the extracted music output devices 20P and 20Q (S346). Herein, as X<Y, the parameter setting unit 244 of the music providing device 20A sets a parameter of the music providing device 20A so that the parameter of the music providing device 20A becomes larger than those of the music output devices 20P and 20Q (S343). For example, the parameter setting unit 244 of the music providing device 20A may set a parameter (e.g., a maximum value) that is larger than a median value or a reference value. In the music providing device 20B, a parameter is set in a similar way. Meanwhile, each of the parameter setting units 244 of the music output devices 20P and 20Q may set a parameter that is smaller than the median value or the reference value.

The music providing device 20A and the music output device 20P determine that the music providing device 20A should operate as a master unit and the music output device 20P should operate as a slave unit through a negotiation using the set parameters (S350). Then, the music providing device 20A and the music output device 20P form a communication group in accordance with the determined topology (the music providing device 20A=a master unit, the music output device 20P=a slave unit).

Figure 13:
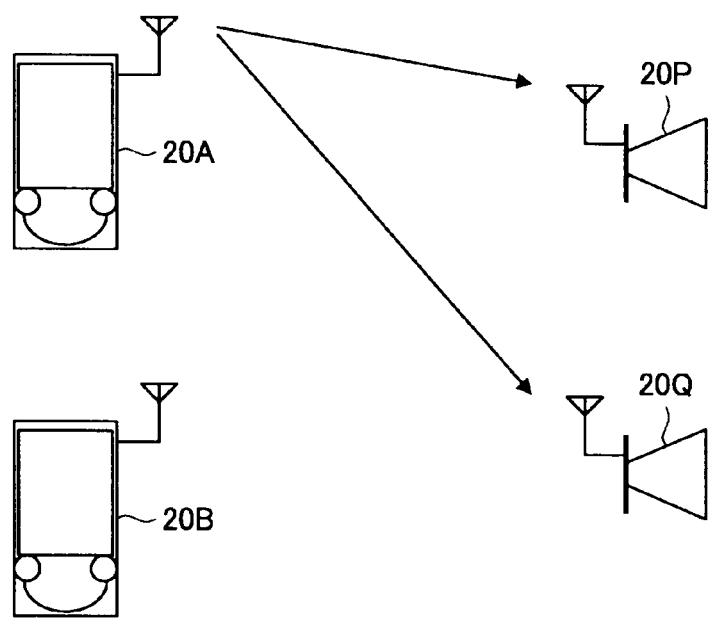
FIG. 13 is an explanatory diagram showing a topology formed in the second arrangement example.

By forming a communication group with such a topology, it becomes possible for the music output device 20Q to join the communication group as a slave unit of the music providing device 20A either voluntarily or as guided by the music output device 20A as shown in FIG. 13. Therefore, the music providing device 20A is able to transmit music data directly to the music output device 20P and the music output device 20Q and cause the music output device 20P and the music output device 20Q to output music. Note that the music providing device 20A may, for example, transmit music data on the L side to the music output device 20P and transmit music data on the R side to the music output device 20Q.

As described above, as music data is transmitted not via a plurality of data paths, the amount of radio resources used can be suppressed. In addition, if the music output device 20P has been operating as a master unit, it is desired that, when the music output device 20Q joins the communication group, a topology be re-formed so that the music providing device 20A becomes a master unit. However, as the music providing device 20A in accordance with an embodiment of the present disclosure operates as a master unit from the beginning in consideration of such future joining of another device in the communication group, re-formation of the topology can be avoided.

(4-3. Topology Formation in Third Arrangement Example)

Figure 14:
FIG. 14 is an explanatory diagram showing a third arrangement example of a plurality of wireless communication devices.

FIG. 14 is an explanatory diagram showing a third arrangement example of a plurality of wireless communication devices 20. As shown in FIG. 14, in the third arrangement example, a music providing device 20A and a music output device 20P are arranged within the mutually communicable range.

In the third arrangement example, the music providing device 20A, upon starting the application 240 as shown in FIG. 8 (S310), discovers the nearby music output device 20P through Device Discovery (S320). Then, the music providing device 20A exchanges application information with the nearby music output device 20P through Service Discovery (S330).

Thereafter, the music providing device 20A determines if there exists any combination of providing devices and user devices as shown in FIG. 9 (S341). In the third arrangement example, the music providing device 20A and the music output device 20P exist. Thus, the music providing device 20A determines that there exists a combination of a providing device and a user device.

Then, the music providing device 20A compares the number (X) of the providing devices and the number (Y) of the user devices (S342). In the third arrangement example, the number (X) of the providing devices is "1" and the number (Y) of the user devices is "1." Thus, X=Y. Therefore, the parameter setting unit 244 of the music providing device 20A extracts the music output device 20P to be paired with the music providing device 20A (S345).

Next, the parameter setting unit 244 of the music providing device 20A again compares the number (X) of the providing devices and the number (Y) of the user devices among the music providing device 20A and the extracted music output device 20P (S346). Herein, as X=Y, the parameter setting unit 244 of the music providing device 20A sets a parameter in consideration of the future topology (S347).

For example, suppose a case where the music providing device 20A is able to provide music data to a plurality of destinations, and the nearby music output device 20P is able to receive music data only from a single source. Then, a case is supposed where the music providing device 20A will transmit music data to a plurality of destinations in future. In such a case, it would be efficient if the music providing device 20A is able to transmit music data directly to the plurality of destinations.

Figure 15:
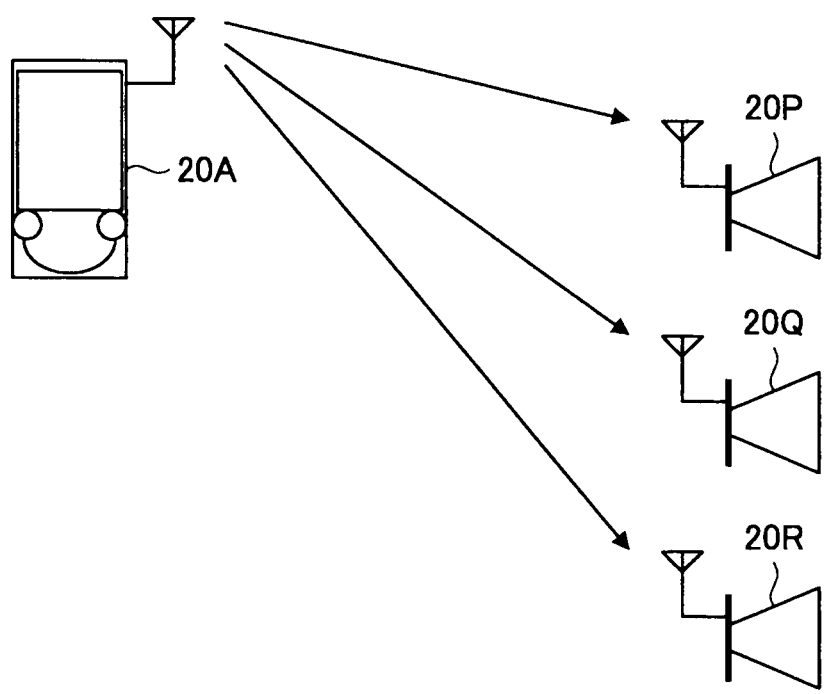
FIG. 15 is an explanatory diagram showing an example of a topology formed in the third arrangement example.

Therefore, the parameter setting unit 244 may, in order for the music providing device 20A to be able to operate as a master unit, set the parameter of the music providing device 20A to be larger than the parameter of the nearby music output device 20P. According to such a configuration, it is possible for the music providing device 20A to, when a plurality of music output devices 20Q and 20R join the communication group in future as shown in FIG. 15, transmit music data directly to the music output devices 20P to 20R.

Meanwhile, suppose a case where the music providing device 20A is able to provide music data only to a single destination, and the nearby music output device 20P is able to receive music data from a plurality of sources. Then, a case is supposed where the nearby music output device 20P will receive music data from a plurality of sources including the music providing device 20A in future. In such a case, it would be efficient if the plurality of sources are able to transmit content data directly to the music output device 20P.

Figure 16:
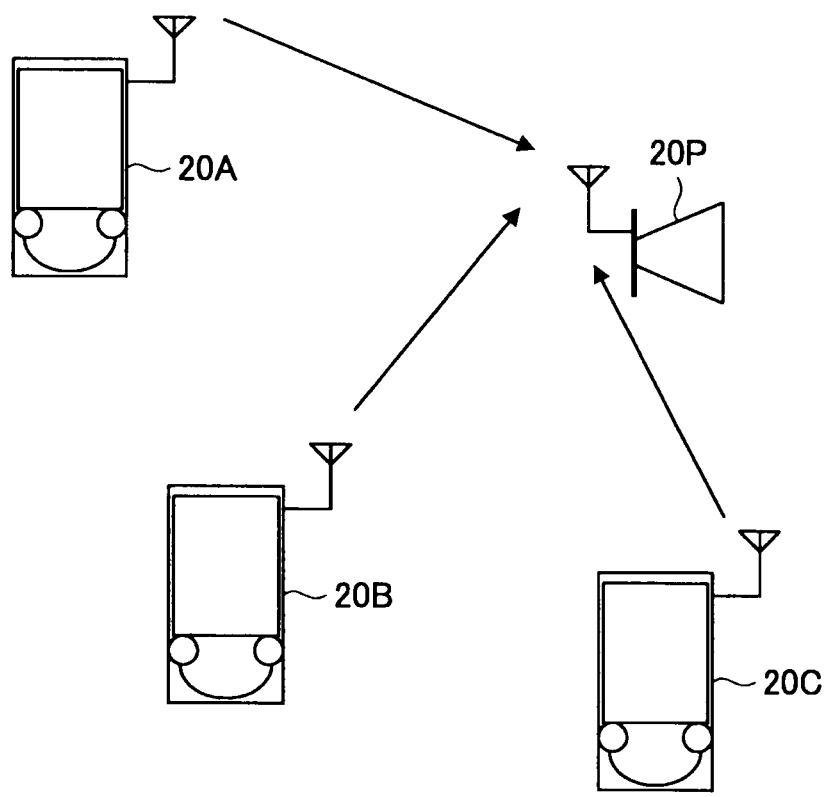
FIG. 16 is an explanatory diagram showing another example of a topology formed in the third arrangement example.

Therefore, the parameter setting unit 244 may, in order for the nearby music output device 20P to be able to operate as a master unit, set a parameter of the music providing device 20A to be smaller than the parameter of the nearby music output device 20P. According to such a configuration, when a plurality of music providing devices 20B and 20C join the communication group in future as shown in FIG. 16, it is possible for the music providing devices 20A to 20C to transmit music data directly to the music output device 20P.

Note that when the music providing device 20A is able to provide music data only to a single destination, and the nearby music output device P is also able to receive music data only from a single source, the parameter setting unit 244 may set a default parameter. Alternatively, the parameter setting unit 244 may set a parameter in accordance with other information of the music providing device 20A or the music output device 20P or a user instruction.

5. Conclusion

As described above, according to the embodiments of the present disclosure, a plurality of wireless communication devices 20 are able to form a communication group with an appropriate topology for the operation of an application that is used after a connection is established. Therefore, as the formation of an inefficient data path is suppressed, low delays and effective use of radio resources can be realized. In addition, as a communication group is formed in consideration of future joining of another wireless communication group 20, it is possible to accept another wireless communication device 20 with an appropriate topology without re-formation of the topology.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the steps in the process of the wireless communication device 20 in this specification need not necessarily be processed in a time-series order in accordance with the order described in the flowchart. For example, the steps in the process of the wireless communication device 20 may be performed in an order different from that described in the flowchart, or be processed in parallel.

It is also possible to create a computer program for causing hardware, which is incorporated in the wireless communication device 20, such as the CPU 201, the ROM 202, and the RAM 203, to exert a function that is equivalent to each of the aforementioned configurations of the wireless communication device 20. In addition, a storage medium having the computer program stored therein is also provided.

The present disclosure contains subject matter related to that disclosed in Japanese Priority Patent Application JP 2011-064109 filed in the Japan Patent Office on Mar. 23, 2011, the entire content of which is hereby incorporated by reference.

What is claimed is:

1. A wireless communication device comprising:
   circuitry configured to
   receive application information, the application information indicating which of a content providing side or a content user side an application of each of one or more second wireless communication devices is;
   set a parameter indicating a priority to operate as a master unit in accordance with, among the wireless communication device and the second wireless communication device(s), a relationship between the number of providing devices whose applications are content providing sides and the number of user devices whose applications are content user sides, wherein the parameter is set so that the priority of the providing devices is lower than the priority of the user devices when the number of the providing devices is larger than the number of the user devices; and
   control a negotiation with at least one of the second wireless communication devices to determine a wireless communication device to operate as a master unit, using the set parameter.

2. The wireless communication device according to claim 1, wherein the circuitry is configured to set the parameter so that the priority of the providing devices is higher than the priority of the user devices when the number of the providing devices is smaller than the number of the user devices.

3. The wireless communication device according to claim 1, wherein the circuitry is configured to:
   extract, from the second wireless communication devices, second wireless communication devices to be paired with the wireless communication device when the number of the providing devices is equal to the number of the user devices; and
   set the parameter in accordance with a relationship between the number of the providing devices and the number of the user devices among the extracted wireless communication devices and the wireless communication device.

4. The wireless communication device according to claim 3, wherein
   application information of an application that is a content providing side includes information indicating the number of destinations to which the content can be provided,
   application information of an application that is a content user side includes information indicating the number of sources from which the content can be provided, and
   the circuitry is configured to set the parameter in accordance with the number of the destinations or the number of the sources indicated by the application information when the number of the providing devices is equal to the number of the user devices among the extracted second wireless communication devices and the wireless communication device.

5. The wireless communication device according to claim 4, wherein the application information is information about an application that is running on the second wireless communication device or an application that the second wireless communication device has.

6. The wireless communication device according to claim 5, wherein the circuitry is configured to handle the second wireless communication device as a second wireless communication device to be paired with the wireless communication device when the second wireless communication device has both a content-providing-side application and a content-user-side application.

7. A wireless communication method comprising:
receiving, with a wireless communication device, application information, the application information indicating which of a content providing side or a content user side an application of each of one or more second wireless communication devices is;
setting a parameter indicating a priority to operate as a master unit in accordance with, among the wireless communication device and the second wireless communication device(s), a relationship between the number of providing devices whose applications are content providing sides and the number of user devices whose applications are content user sides, wherein the parameter is set so that the priority of the providing devices is lower than the priority of the user devices when the number of the providing devices is larger than the number of the user devices; and
controlling a negotiation with at least one of the second wireless communication devices to determine a wireless communication device to operate as a master unit, using the set parameter.

8. A non-transitory computer-readable medium including a program, which when executed by a wireless communication device, causes the wireless communication device to:
receive application information, the application information indicating which of a content providing side or a content user side an application of each of one or more second wireless communication devices is;
set a parameter indicating a priority to operate as a master unit in accordance with, among the wireless communication device and the second wireless communication device(s), a relationship between the number of providing devices whose applications are content providing sides and the number of user devices whose applications are content user sides, wherein the parameter is set so that the priority of the providing devices is lower than the priority of the user devices when the number of the providing devices is larger than the number of the user devices; and
control a negotiation with at least one of the second wireless communication devices to determine a wireless communication device to operate as a master unit, using the set parameter.

9. A wireless communication system comprising:
a first wireless communication device; and
one or more second wireless communication devices, wherein
the first wireless communication device includes:
circuitry configured to
receive application information, the application information indicating which of a content providing side or a content user side an application of each of the one or more second wireless communication devices is;
set a parameter indicating a priority to operate as a master unit in accordance with, among the first wireless communication device and the second wireless communication device(s), a relationship between the number of providing devices whose applications are content providing sides and the number of user devices whose applications are content user sides, wherein the parameter is set so that the priority of the providing devices is lower than the priority of the user devices when the number of the providing devices is larger than the number of the user devices; and
control a negotiation with at least one of the second wireless communication devices to determine a wireless communication device to operate as a master unit, using the parameter set by the setting unit.

* * * * *